United States Patent
Caveny et al.

(10) Patent No.: US 7,810,566 B2
(45) Date of Patent: Oct. 12, 2010

(54) SETTABLE COMPOSITIONS FREE OF PORTLAND CEMENT AND ASSOCIATED METHODS OF USE

(75) Inventors: William J. Caveny, Rush Springs, OK (US); Rickey L. Morgan, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 24 days.

(21) Appl. No.: 11/480,176

(22) Filed: Jun. 30, 2006

(65) Prior Publication Data

US 2008/0000641 A1    Jan. 3, 2008

(51) Int. Cl.
*E21B 33/14* (2006.01)
*E21B 33/138* (2006.01)
*C04B 7/345* (2006.01)
*C09K 8/46* (2006.01)

(52) U.S. Cl. ............... 166/292; 166/281; 106/772; 106/788; 106/798; 106/799; 106/800

(58) Field of Classification Search ............... 166/292, 166/281; 106/739, 792, 693, 695, 772, 788, 106/796, 798–800
See application file for complete search history.

(56) References Cited

U.S. PATENT DOCUMENTS

| | | | |
|---|---|---|---|
| 3,425,853 A | | 2/1969 | Rives |
| 3,649,318 A | | 3/1972 | Stiglitz |
| 3,741,307 A | * | 6/1973 | Sandiford et al. ........... 166/400 |
| 4,120,360 A | | 10/1978 | Messenger |
| 4,235,291 A | | 11/1980 | Messenger |
| 5,058,679 A | * | 10/1991 | Hale et al. ................. 166/293 |
| 5,106,423 A | * | 4/1992 | Clarke ........................ 106/789 |
| 5,383,521 A | * | 1/1995 | Onan et al. ................. 166/293 |
| 5,437,721 A | | 8/1995 | Kupper et al. |
| 5,501,277 A | * | 3/1996 | Onan et al. ................. 166/293 |
| 5,696,059 A | * | 12/1997 | Onan et al. ................. 507/269 |
| 5,749,418 A | | 5/1998 | Mehta et al. |
| 5,900,053 A | | 5/1999 | Brothers et al. |
| 5,968,255 A | | 10/1999 | Mehta et al. |
| 5,972,103 A | | 10/1999 | Mehta et al. |
| 6,143,069 A | | 11/2000 | Brothers et al. |
| 6,264,740 B1 | * | 7/2001 | McNulty, Jr. ............... 106/817 |
| 6,332,921 B1 | | 12/2001 | Brothers et al. |
| 6,457,524 B1 | | 10/2002 | Roddy |
| 6,488,763 B2 | | 12/2002 | Brothers et al. |
| 6,689,208 B1 | | 2/2004 | Brothers |
| 6,796,378 B2 | | 9/2004 | Reddy et al. |
| 6,846,357 B2 | | 1/2005 | Reddy et al. |
| 6,904,971 B2 | | 6/2005 | Brothers et al. |
| 6,908,508 B2 | | 6/2005 | Brothers |
| 7,021,380 B2 | | 4/2006 | Caveny et al. |
| 7,055,603 B2 | | 6/2006 | Caveny et al. |
| 2002/0162487 A1 | * | 11/2002 | D'Almeida et al. ......... 106/789 |
| 2004/0211562 A1 | | 10/2004 | Brothers et al. |
| 2004/0244650 A1 | | 12/2004 | Brothers |
| 2004/0255823 A1 | | 12/2004 | Comrie |
| 2005/0034864 A1 | | 2/2005 | Caveny et al. |
| 2005/0056191 A1 | | 3/2005 | Brothers et al. |
| 2005/0167105 A1 | | 8/2005 | Roddy et al. |
| 2006/0048683 A1 | | 3/2006 | Chatterji et al. |
| 2006/0081372 A1 | | 4/2006 | Dealy et al. |

FOREIGN PATENT DOCUMENTS

| GB | 995348 | 6/1965 |
|---|---|---|
| WO | WO 2005/068582 | 7/2005 |

OTHER PUBLICATIONS

Halliburton brochure entitled Spherelite Cement Additive dated 1999.
Pough, Frederick, "A Field Guide to Rocks and Minerals," Fourth Edition, pp. 224-226, 239, 245, 252.
"Portland Cement," Wikipedia, The Free Encyclopedia, Jun. 12, 2006, 09:25 UTC. Wikimedia Foundation, Inc.
TXI Material Safety Data Sheet—Pressur-Seal.
Parker, Pat, "Specialty Cements Can Solbe Special Problems" Oil and Gas Journal, Feb. 28, 1977, pp. 129-131.
Halliburton brochure entitled "ThermaLock™ Cement For Corrosive CO2 Environments" dated 1999.
Halliburton brochure entitled "Cal-Seal 60 Cement Accelerator" dated 1999.
Halliburton brochure entitled "MicroBond Expanding Additive for Cement" dated 1999.
Halliburton brochure entitled "MicroBond HT Cement Additive" dated 1999.
Halliburton brochure entitled "MicroBond M Cement Additive" dated 1999.
Halliburton brochure entitled "Silicalite Cement Additive" dated 1999.
Foreign communication from a related counterpart application.

* cited by examiner

*Primary Examiner*—George Suchfield
(74) *Attorney, Agent, or Firm*—Craig W. Roddy; McDermott Will & Emery LLP

(57) ABSTRACT

Methods of preparing improved settable compositions free of Portland cement and methods of using such compositions in subterranean operations are provided. An example of a method of preparing such compositions may comprise providing an unhydrated mixture of raw materials comprising a silica component, an aluminum component, a magnesium component, a sodium component, a calcium component, a ferrous or ferric component, a sulfurous component, and a potassium component, wherein the mixture has been formed without heating any of the components to above about 3000° F.; and adding water to the unhydrated mixture of raw materials to form a settable composition.

12 Claims, No Drawings

SETTABLE COMPOSITIONS FREE OF PORTLAND CEMENT AND ASSOCIATED METHODS OF USE

BACKGROUND

The present invention relates generally to subterranean cementing operations, and more particularly, to methods of preparing improved settable compositions free of Portland cement and methods of using such compositions in subterranean operations.

Hydraulic cement compositions commonly are utilized in subterranean operations, particularly subterranean well completion and remedial operations. For example, hydraulic cement compositions often may be used in primary cementing operations whereby pipe strings, such as casings and liners, are cemented in well bores. In performing primary cementing, hydraulic cement compositions may be placed within an annular space between the walls of a well bore and the exterior surface of a pipe string disposed therein. The cement composition is permitted to set in the annular space, thereby forming therein an annular sheath of hardened substantially impermeable cement that supports and positions the pipe string in the well bore, and that bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

A broad variety of hydraulic cement compositions have been used in conventional subterranean cementing operations, including, inter alia, cement compositions comprising Portland cement. Portland cement is generally prepared from a mixture of raw materials comprising calcium oxide, silicon oxide, aluminium oxide, ferric oxide, and magnesium oxide. The mixture of the raw materials is heated in a kiln to approximately 3000° F., thereby initiating chemical reactions between the raw materials. In these reactions, crystalline compounds, dicalcium silicates, tricalcium silicates, tricalcium aluminates, and tetracalcium aluminoferrites, are formed. The product of these reactions is known as a clinker. The addition of gypsum to the clinker and the pulverization of the mixture results in a fine powder that will react to form a slurry upon the addition of water.

There are drawbacks, however, to the conventional preparation and use of Portland cement. The energy requirements to produce Portland cement are quite high, and heat loss during production can further cause actual energy requirements to be even greater. These factors contribute significantly to the relatively high cost of Portland cement. Generally, Portland cement is a major component of the cost of hydraulic cement compositions that comprise Portland cement. Recent Portland cement shortages, however, have further contributed to the rising cost of hydraulic cement compositions that comprise Portland cement. Conventional efforts to reduce the cost of cement compositions have included incorporating other solid particulate components in the cement composition in addition to, or in place of, the Portland cement. The resulting combination of multiple solid particulate materials in the cement compositions often results in a "settling effect," in which different sized particulate materials will settle separately at different speeds. This settling of the solids in a cement composition has resulted in defective cementing and failure of the set cement to provide zonal isolation.

SUMMARY

The present invention relates generally to subterranean cementing operations, and more particularly, to methods of preparing improved settable compositions free of Portland cement and methods of using such compositions in subterranean operations.

In one embodiment, the present invention provides a method comprising providing an unhydrated mixture of raw materials comprising a silica component, an aluminum component, a magnesium component, a sodium component, a calcium component, a ferrous or ferric component, a sulfurous component, and a potassium component, wherein the mixture has been formed without heating any of the components to above about 3000° F.; and adding water to the unhydrated mixture of raw materials to form a settable composition.

In another embodiment, the present invention provides a method comprising providing a settable composition comprising an unhydrated mixture of raw materials comprising a silica component, an aluminum component, a magnesium component, a sodium component, a calcium component, a ferrous or ferric component, a sulfurous component, and a potassium component, wherein the mixture has been formed without heating any of the components to above about 3000° F., and water; placing the settable composition into a subterranean formation; and allowing the settable composition to set therein.

In another embodiment, the present invention provides a method of cementing a subterranean formation comprising: preparing a settable composition comprising providing a silica component, an aluminum component, a magnesium component, a sodium component, a calcium component, a ferrous or ferric component, a sulfurous component, and a potassium component; combining the components to form an unhydrated mixture of raw materials, wherein combining the components does not involve heating the components; and adding water to the unhydrated mixture of raw materials; placing the settable composition into a subterranean formation; and allowing the settable composition to set therein.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates generally to subterranean cementing operations, and more particularly, to methods of preparing improved settable compositions free of Portland cement and methods of using such compositions in subterranean operations. Although these settable compositions are free of Portland cement, they may be beneficial for use in subterranean cementing operations, including those that would normally employ a Portland cement.

The improved settable compositions of the present invention generally comprise water and an unhydrated mixture of raw materials comprising a silica component, an aluminum component, a magnesium component, a sodium component, a calcium component, a ferrous component, a sulfurous component, and a potassium component. Other additives suitable for use in conjunction with subterranean cementing operations also may be added to these settable compositions if desired. Among other things, the settable compositions of the present invention may provide a more economical hydraulic settable composition than cement compositions heretofore used because, inter alia, the unhydrated mixture of raw materials does not need to be heated at high temperatures. Another advantageous feature of the present invention is that Portland cement shortages would not prevent the use of the settable compositions of the present invention.

The components of the unhydrated mixture of raw materials may be provided from an expanded shale, a vitrified shale, or a non-vitrified shale. An expanded shale generally comprises natural shale and additional components that may be added to the natural shale, as needed, to customize the natural shale for a particular use. For example, additional components that may be added to the natural shale may be a silica component, a magnesium component, an aluminum component, a sodium component, or combinations thereof. An example of a suitable shale is commercially available under the tradename "PRESSUR-SEAL Fine" from TXI Operations L.P., Dallas, Tex. One of ordinary skill in the art, with the benefit of this disclosure, will recognize the proper amounts and types of expanded shale necessary for use in a particular application.

The silica component used in the settable compositions of the present invention may comprise a silicon atom or ion. Examples of suitable silica components include, but are not limited to, naturally occurring silica, hornblende, muscovite, biotite, phlogopite, lepidolite, kaolin, microcline, plagioclase, orthoclase, amorphous silicon dioxide, and crystalline silicon dioxide. The silica component may be present in the settable compositions of the present invention in an amount sufficient to form calcium silicate hydrates upon reaction with a source of water and a source of calcium. More particularly, the silica component may be present in the settable composition in an amount in the range of from about 10% to about 70% percent by weight of the unhydrated mixture of raw materials. In certain embodiments, the silica component may be present in the settable composition in an amount in the range of from about 25% to about 35% by weight of the unhydrated mixture of raw materials.

The aluminum component may comprise an aluminum atom or ion. Examples of suitable aluminum components include, but are not limited to, naturally occurring aluminum, hornblende, muscovite, biotite, phlogopite, lepidolite, kaolin, microcline, plagioclase, and orthoclase. The aluminum component is present in the settable compositions of the present invention in an amount sufficient to form calcium aluminate hydrates upon reaction with a source of water and a calcium component and to form calcium alumino ferrite hydrates upon reaction with a source of water, calcium, and iron. More particularly, the aluminum component may be present in the settable composition in an amount in the range of from about 1% to about 17% percent by weight of the unhydrated mixture of raw materials. In certain embodiments, the aluminum component may be present in the settable composition in an amount in the range of from about 8% to about 10% by weight of the unhydrated mixture of raw materials.

The magnesium component may comprise a magnesium atom or ion. Examples of suitable magnesium components include, but are not limited to, naturally occurring magnesium, magnesium oxide, magnesium chloride, and magnesium sulfate. The magnesium component may be present in the settable composition in an amount in the range of from about 0.5% to about 6% percent by weight of the unhydrated mixture of raw materials. In certain embodiments, the magnesium component may be present in the settable composition in an amount in the range of from about 2.5% to about 3.5% by weight of the unhydrated mixture of raw materials.

The sodium component may comprise a sodium atom or ion. Examples of suitable sodium components include, but are not limited to, naturally occurring sodium, sodium chloride, sodium sulfate, sodium carbonate, and sodium hydroxide. The sodium component may be present in the settable composition in an amount in the range of from about 0.1% to about 5% percent by weight of the unhydrated mixture of raw materials. In certain embodiments, the sodium component may be present in the settable composition in an amount that is less than 1% by weight of the unhydrated mixture of raw materials.

The calcium component may comprise a calcium atom or ion. Examples of suitable calcium components include, but are not limited to, calcium hydroxide, calcium oxide, naturally occurring calcium, calcium chloride, calcium sulfate, calcium carbonate, and calcium silicate. The calcium component may be present in the settable composition in an amount in the range of from about 5% to about 50% percent by weight of the unhydrated mixture of raw materials. In certain embodiments, the calcium component may be present in the settable composition in an amount in the range of 15% to about 20% by weight of the unhydrated mixture of raw materials.

The ferrous or ferric component may comprise an iron atom or ion. Examples of suitable ferrous components and ferric components include, but are not limited to, naturally occurring iron, ferric chloride, ferrous chloride, ferric sulfate, ferrous sulfate, ferric carbonate, ferrous carbonate, ferric hydroxide, ferrous hydroxide, ferric silicate, and ferrous silicate. The ferrous or ferric component may be present in the settable composition in an amount in the range of from about 1% to about 15% percent by weight of the unhydrated mixture of raw materials. In certain embodiments, the ferrous or ferric component may be present in the settable composition in an amount in the range of 8% to about 10% by weight of the unhydrated mixture of raw materials. The unhydrated mixture may comprise a ferrous component, a ferric component, or a combination of the two.

The sulfurous component may comprise a sulfur atom or ion. Examples of suitable sulfurous components include, but are not limited to, naturally occurring sulfur, magnesium sulfate, sodium sulfate, calcium sulfate, ferric sulfate, potassium sulfate, and ferrous sulfate. The sulfurous component may be present in the settable composition in an amount in the range of from about 1% to about 50% percent by weight of the unhydrated mixture of raw materials. In certain embodiments, the sulfurous component may be present in the settable composition in an amount in the range of 25% to about 30% by weight of the unhydrated mixture of raw materials.

The potassium component may comprise a potassium atom or ion. Examples of suitable potassium components include, but are not limited to, naturally occurring potassium, potassium chloride, potassium sulfate, potassium carbonate, potassium hydroxide, and potassium silicate. The potassium component may be present in the settable composition in an amount in the range of from about 0.5% to about 5% percent by weight of the unhydrated mixture of raw materials. In certain embodiments, the potassium component may be present in the settable composition in an amount that is less than 1% by weight of the unhydrated mixture of raw materials.

The water utilized in the settable compositions of the present invention can be fresh water, salt water (e.g., water containing one or more salts dissolved therein), brine (e.g., saturated salt water), or seawater. Generally, the water can be from any source provided that it does not contain an excess of compounds, e.g., dissolved organics, that may adversely affect other components in the settable composition. The water may be present in an amount sufficient to form a pumpable slurry. More particularly, the water is present in the settable compositions in an amount in the range of from about 20% to about 200% by weight of the unhydrated mixture of raw materials. In certain embodiments, the water is present in the settable compositions in an amount in the range of from about 30% to about 45% by weight of the unhydrated mixture of raw materials.

In certain embodiments, the settable compositions of the present invention may optionally comprise a zinc component, a strontium component, a titanium component, a manganese component, or a combination thereof. Examples of suitable zinc components include, but are not limited to, naturally occurring zinc, zinc chloride, and zinc sulfate. Examples of suitable strontium components include, but are not limited to, naturally occurring strontium, strontium chloride, and strontium sulfate. Examples of suitable titanium components include, but are not limited to, naturally occurring titanium, titanium chloride, and titanium sulfate. Examples of suitable manganese components include, but are not limited to, naturally occurring manganese, manganese chloride, and manganese sulfate. In certain embodiments, each of these components may be present in a range of about 0.1% to about 2% by weight of the unhydrated mixture of raw materials. Among other things, these components may serve as set retarders in the settable compositions of the present invention.

Optionally, the settable compositions of the present invention may comprise microspheres, or the like, for the purpose of, inter alia, reducing the density of the settable composition. Because microspheres have specific gravities below about 1.0, their inclusion in a settable composition acts to reduce the density of the overall settable composition. Any microspheres that are compatible with a subterranean settable composition, e.g., that are chemically stable over time upon incorporation into the settable composition, may be used. An example of a suitable microsphere is commercially available from Halliburton Energy Services, Inc., of Houston, Tex., under the tradename "SPHERELITE." Where included, the microspheres may be present in the settable composition in an amount sufficient to provide a settable composition having a density in a desired range. More particularly, the microspheres may be present in the settable composition in an amount in the range of from about 10% to about 100% by weight of the unhydrated mixture of raw materials.

Additional additives may be added to the settable compositions of the present invention as deemed appropriate by one skilled in the art with the benefit of this disclosure. Examples of such additives include, inter alia, fluid loss control additives, defoamers, dispersing agents, set accelerators, salts, formation conditioning agents, weighting agents, set retarders, and the like.

An example of a method of the present invention comprises preparing a settable composition that comprises providing a silica component, an aluminum component, a magnesium component, a sodium component, a calcium component, a ferrous component, a sulfurous component, and a potassium component; combining the components to form an unhydrated mixture of raw materials, and adding water to the unhydrated mixture of raw materials. At no point during the preparation of the unhydrated mixture of raw materials are the components heated to above about 3000° F. In certain embodiments, the unhydrated mixture of raw materials is not heated to above about 2000° F. In certain embodiments, the unhydrated mixture of raw materials is not heated to above about 1000° F. Indeed, in certain embodiments, preparation of the unhydrated mixture of raw materials involves no heating at all.

Another example of a method of the present invention comprises preparing a settable composition that comprises providing a silica component, an aluminum component, a magnesium component, a sodium component, a calcium component, a ferrous or ferric component, a sulfurous component, and a potassium component; combining the components to form an unhydrated mixture of raw materials; and adding water to the unhydrated mixture of raw materials; placing the settable composition in a subterranean formation; and allowing the settable composition to set therein.

To facilitate a better understanding of the present invention, the following examples of certain aspects of some embodiments are given. In no way should the following examples be read to limit, or define, the entire scope of the invention.

EXAMPLE 1

A test sample of an embodiment of the settable compositions of the present invention was made. To prepare the sample, an unhydrated mixture of raw materials was prepared comprising 100% vitrified shale, 10% hydrated lime by weight of vitrified shale, 10% SILICALITE™ by weight of vitrified shale, 5% CAL-SEAL™ by weight of vitrified shale, and 1% MICROBOND™ by weight of vitrified shale. The unhydrated mixture of raw materials was then hydrated by adding 86.33% water by weight of vitrified shale. The calculated density of the sample was 12.99 lb/gallon. The slurry yield of the mixture was 2.05 ft³/sack of vitrified shale with the addition of 9.74 gallons of water/sack of vitrified shale. The sample was then subjected to testing per API Specification 10-B-2. Testing was performed after curing samples at 149° F. at atmospheric pressure. The results of testing are reported in Table 1 below. Example 1 demonstrates, inter alia, that the settable compositions of the present invention are suitable for use in subterranean applications.

TABLE 1

Strength Testing of Settable Composition

| Curing Time | Compressive Strength (psi) |
| --- | --- |
| 66 Hours | 427 |
| 5 Days | 409 |
| 7 Days | 426 |

EXAMPLE 2

A test sample of an embodiment of the settable compositions of the present invention was made. To prepare the sample, an unhydrated mixture of raw materials was prepared comprising 100% vitrified shale, 10% hydrated lime by weight of vitrified shale, 5% CAL-SEAL™ by weight of vitrified shale, and 1% MICROBOND™ by weight of vitrified shale. The unhydrated mixture of raw materials was then hydrated by adding 71.67% water by weight of vitrified shale. The calculated density of the sample was 13.3 lb/gallon. The slurry yield of the mixture was 1.77 ft³/sack of vitrified shale with the addition of 8.09 gallons of water/sack of vitrified shale. The sample was then subjected to testing per API Specification 10-B-2. Testing was performed after curing samples at 149° F. at atmospheric pressure. The results of testing are reported in Table 2 below. Example 2 demonstrates, inter alia, that the settable compositions of the present invention are suitable for use in subterranean applications.

TABLE 2

Strength Testing of Settable Composition

| Curing Time | Compressive Strength (psi) |
|---|---|
| 66 Hours | 778 |
| 5 Days | 833 |
| 7 Days | 800 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing an unhydrated mixture of raw materials comprising a silica component, an aluminum component, a magnesium component, a sodium component, a calcium component, a ferrous or ferric component, a sulfurous component, and a potassium component, wherein the unhydrated mixture of raw materials is made using no heat;
adding to the unhydrated mixture of raw materials a component selected from the group consisting of: a zinc component, a strontium component, a manganese component, and combinations thereof
adding water to the unhydrated mixture of raw materials to form a settable composition; and
placing the settable composition in an annular space between a wall of a well bore and an exterior surface of a pipe string during a primary cementing operation.

2. The method of claim 1 wherein the water is present in the settable composition in an amount in the range of from about 20% to about 200% by weight of the unhydrated mixture of raw materials.

3. The method of claim 1 wherein the unhydrated mixture of raw materials comprises the silica component present in the range of from about 10% to about 70% percent by weight of the unhydrated mixture of raw materials, the aluminum component present in the range of from about 1% to about 17% percent by weight of the unhydrated mixture of raw materials, the magnesium component present in the range of from about 0.5% to about 6% percent by weight of the unhydrated mixture of raw materials, the sodium component present in the range of from about 0.1% to about 5% percent by weight of the unhydrated mixture of raw materials, the calcium component present in the range of from about 5% to about 50% by weight of the unhydrated mixture of raw materials, the ferrous or ferric component present in the range of from about 1% to about 15% by weight of the unhydrated mixture of raw materials, the sulfurous component present in the range of from about 1% to about 50% by weight of the unhydrated mixture of raw materials, and the potassium component present in the range of from about 0.5% to about 5% by weight of the unhydrated mixture of raw materials.

4. A method comprising:
providing a settable composition comprising water and an unhydrated mixture of raw materials comprising a silica component, an aluminum component, a magnesium component, a sodium component, a calcium component, a ferrous or ferric component, a sulfurous component, a potassium component, and a component selected from the group consisting of: a zinc component, a strontium component, a manganese component, and combinations thereof;
wherein the unhydrated mixture of raw materials is made using no heat;
placing the settable composition into a subterranean formation as part of a remedial cementing operation; and
allowing the settable composition to set therein.

5. The method of claim 4 wherein the water is present in the settable composition in an amount in the range of from about 20% to about 200% by weight of the unhydrated mixture of raw materials.

6. The method of claim 4 wherein the unhydrated mixture of raw materials comprises the silica component present in the range of from about 10% to about 70% percent by weight of the unhydrated mixture of raw materials, the aluminum component present in the range of from about 1% to about 17% percent by weight of the unhydrated mixture of raw materials, the magnesium component present in the range of from about 0.5% to about 6% percent by weight of the unhydrated mixture of raw materials, the sodium component present in the range of from about 0.1% to about 5% percent by weight of the unhydrated mixture of raw materials, the calcium component present in the range of from about 5% to about 50% by weight of the unhydrated mixture of raw materials, the ferrous or ferric component present in the range of from about 1% to about 15% by weight of the unhydrated mixture of raw materials, the sulfurous component present in the range of from about 1% to about 50% by weight of the unhydrated mixture of raw materials, and the potassium component present in the range of from about 0.5% to about 5% by weight of the unhydrated mixture of raw materials.

7. A method of cementing in a subterranean formation comprising:
providing a settable composition comprising: water and an unhydrated mixture of raw materials comprising a silica component, an aluminum component, a magnesium component, a sodium component, a calcium component, a ferrous or ferric component, a sulfurous component, a potassium component, and a component selected from the group consisting of: a zinc component, a strontium component, a manganese component, and combinations thereof
wherein the unhydrated mixture of raw materials is made using no heat;
placing the settable composition into a permeable zone of a subterranean formation; and
allowing the settable composition to set therein.

8. The method of claim 7 wherein the water is present in the settable composition in an amount in the range of from about 20% to about 200% by weight of the unhydrated mixture of raw materials.

9. The method of claim 7 wherein the unhydrated mixture of raw materials comprises the silica component present in the range of from about 10% to about 70% percent by weight of the unhydrated mixture of raw materials, the aluminum component present in the range of from about 1% to about 17% percent by weight of the unhydrated mixture of raw materials, the magnesium component present in the range of from about 0.5% to about 6% percent by weight of the unhydrated mixture of raw materials, the sodium component present in the range of from about 0.1% to about 5% percent by weight of the unhydrated mixture of raw materials, the calcium component present in the range of from about 5% to about 50% by weight of the unhydrated mixture of raw materials, the ferrous or ferric component present in the range of from about 1% to about 15% by weight of the unhydrated mixture of raw materials, the sulfurous component present in the range of from about 1% to about 50% by weight of the unhydrated mixture of raw materials, and the potassium component present in the range of from about 0.5% to about 5% by weight of the unhydrated mixture of raw materials.

10. A method comprising:
providing an unhydrated mixture of raw materials comprising a silica component, an aluminum component, a magnesium component, a sodium component, a calcium component, a ferrous or ferric component, a sulfurous component, a potassium component, and a component selected from the group consisting of: a zinc component, a strontium component, a manganese component, and combinations thereof;
wherein the unhydrated mixture of raw materials is made using no heat;
adding water to the unhydrated mixture of raw materials to form a settable composition; and
placing the settable composition into a fracture in a subterranean formation.

11. The method of claim 10 wherein the water is present in the settable composition in an amount in the range of from about 20% to about 200% by weight of the unhydrated mixture of raw materials.

12. The method of claim 10 wherein the unhydrated mixture of raw materials comprises the silica component present in the range of from about 10% to about 70% percent by weight of the unhydrated mixture of raw materials, the aluminum component present in the range of from about 1% to about 17% percent by weight of the unhydrated mixture of raw materials, the magnesium component present in the range of from about 0.5% to about 6% percent by weight of the unhydrated mixture of raw materials, the sodium component present in the range of from about 0.1% to about 5% percent by weight of the unhydrated mixture of raw materials, the calcium component present in the range of from about 5% to about 50% by weight of the unhydrated mixture of raw materials, the ferrous or ferric component present in the range of from about 1% to about 15% by weight of the unhydrated mixture of raw materials, the sulfurous component present in the range of from about 1% to about 50% by weight of the unhydrated mixture of raw materials, and the potassium component present in the range of from about 0.5% to about 5% by weight of the unhydrated mixture of raw materials.

* * * * *